Aug. 23, 1966  S. I. NIKITIN ETAL  3,268,286
LOW-NOISE MOTION PICTURE CAMERA
Filed Aug. 27, 1963

United States Patent Office 3,268,286
Patented August 23, 1966

3,268,286
LOW-NOISE MOTION PICTURE CAMERA
Sergei Innokentjevich Nikitin, Georgy-Viktor Vilgelmovich Mering, Falk Solomonovich Novik, and Nicolai Stepanovich Popov, Moscow, and Lazar Abramovich Slutsky, Station Tomilino, Moscowsky Region, all of U.S.S.R., assignors to Moskowskoje Konstruktorskoje Bureau Kinoapparatury
Filed Aug. 27, 1963, Ser. No. 304,792
2 Claims. (Cl. 352—166)

The present invention pertains to motion picture cameras and, more exactly, to low-noise motion picture cameras intended for synchronous shooting i.e. for shooting motion picture images with simultaneous recording of sound on a sound recording facility, the microphone for which may be located in immediate proximity to the operating low-noise motion picture camera.

Motion picture cameras with a mirror reflex shutter are well known. However, to reduce the noise level, glass is installed in the body of the camera in front of the taking lens thereby serving to suppress the noise of the operating camera.

Installation of such glass in the path of the light rays and makes lens changing, adjustment and other operational features difficult.

Use of the mirror reflex shutter in motion picture cameras has materially complicated the problem of providing low-noise operation, of such cameras. This problem arises from the fact that in cameras with a mirror reflex shutter located below the camera aperture and with the shutter rod, film feed and transport mechanisms located in space at angles to each other and at relatively large distances, a rather complicated power train is required. Such a power train requires the use of intermediate transmissions and increased gear diameters which lower the efficiency of the mechanisms and increases the power requirements of the drive which consequently increases the number and intensity of noise sources.

Although attempts have been made to overcome the above-named (and other) drawbacks, not one of them, as far as we know, was effective in implementation on an industrial scale.

The object of the invention is, first of all, that the main shaft of the motion picture camera is located at an angle to the optical axis of the camera, owing to which the number of gear transmissions is reduced and their optimum parameters are obtained (diameters, number of teeth, peripheral speeds, intertooth pressures).

Another object of the invention is the application of non-multiple transmission ratios of gear transmissions of the camera mechanism.

A further object of the invention is that the low-noise motion picture camera is provided with sound-insulation of the camera body, i.e. the latter is made without a hole for the unit transmittting rotation to the cassette take-up, which is provided with an independent electric drive.

The basic aim of the present invention is the creation of a low-noise motion picture camera with a mirror reflex shutter for synchronous shooting, permitting an increase in the quality of motion picture images owing to the elimination of sound insulating glass to facilitate high-quality sound recording with the aid of a microphone installed in immediate proximity to the motion picture camera.

Another aim of the invention is also the reduction of camera noise level and shifting the noise maximum to the region of low frequencies (50–200 c.p.s.).

Still another aim of the invention is the increase of wear resistance and operating stability of the mechanism.

In accordance with the above-named and other aims, the invention consists of a new device and combination of parts and details of design, which is described here and below and presented in the appended claims, and it will be clear that changes in exact implementation of the invention here disclosed may be made within the scope of the appended claims, without any deviation from the idea of the invention.

Other aims and advantages of the invention will be evident from the following detailed description and the accompanying drawings, in which.

Figure 1:
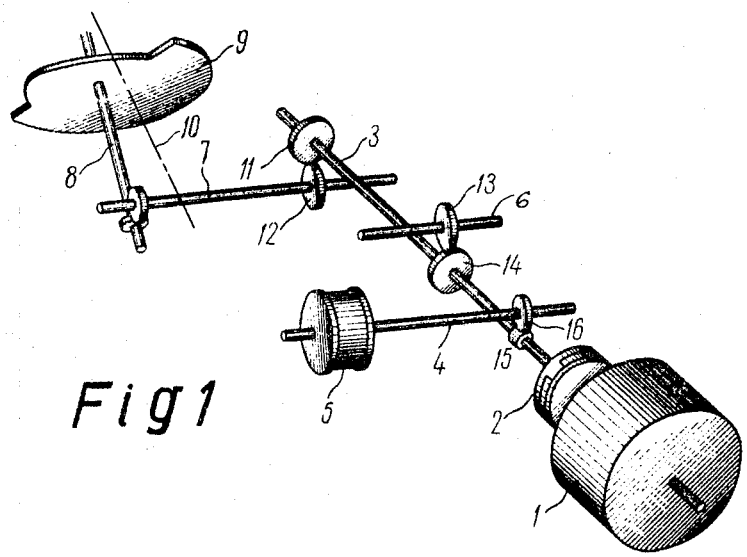
FIG. 1 shows the kinematic diagram of the low-noise motion picture camera drive of this invention.

As seen from FIG. 1, rotation is transmitted to the main shaft 3 from synchronous electric motor 1 through the elastic coupling 2. The main shaft 3 in its turn, transmits rotation to shaft 4 of the sprocket 5 which transports the film, shaft 6 of the claw mechanism and intermediate shaft 7 from which rotation is transmitted to shaft 8 of mirror reflex shutter 9.

The main shaft 3 of the camera is located at an angle to the optical axis of the camera, which in FIG. 1 is shown as a dash-dotted line and is designated by number 10.

The shown location of shaft 3 relative to the optical axis 10 has made it possible to use toothed gears 11, 12, 13, 14, 15 and 16 of small diameters with low peripheral speeds.

Since main shaft 3 connected with the synchronous electric motor shaft, supplied with alternating current of a frequency of e.g. 50 c.p.s. receives 25 revolutions per second, while shaft 6 of the claw mechanism and shaft 8 of mirror reflex shutter 9 must have 24 revolutions per second, and shaft 4 of the sprocket 5 must have 3 revolutions per second, the coupling of these elements with the main shaft is effected by toothed pairs with non-multiple transmission ratios of 24:25 and 3:25.

Figure 2:
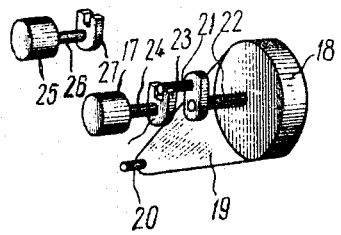
FIG. 2 shows the kinematic diagram of cassette take-up device provided with independent electric drive.

The drive of cassette take-up device 17, shown in FIG. 2, is effected in the camera by the low-noise independent electric motor 18 installed on bracket 19, which is pivotally mounted on shaft 20. The separable coupling between the take-up device 17 and coaxially disposed electric motor 18 is effected a mechanism comprising driver 21, fixed on shaft 22 of electric motor 18, and driven part 23, installed on shaft 24 of cassette take-up device 17.

During reverse motion, the electric motor 18 and bracket 19 are pivotally displaced about shaft 20, shifting to the extreme left-hand position for coupling with cassette take-up device 25, on shaft 26 through part 27 similar to part 23.

Owing to the use of independent electric motor 18 for the drive of cassette take-up device 17 (cassette take-up 25), the camera body may be made without a hole for the unit transmitting rotation to the cassette take-up device.

All the above-mentioned measures (location of the main shaft 3 of the camera at an angle to the optical axis 10, the use of gears with non-multiple ratio, and independent electric motor 18 to drive the take-up device 17 [take-up device 25]) have made it possible to create a low-noise motion picture camera and to shift the maximum of noise spectrum to the band of low frequencies, and also to do away with sound-proof glass in front of the taking lens.

Figure 3:
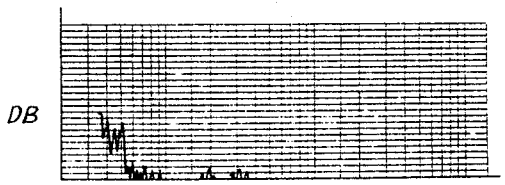
FIG. 3 shows the recorded spectrogram of noise level of the experimental camera, made on the basis of the kinematic diagram shown in FIG. 1 and FIG. 2.

The noise level spectrogram of the operating camera, shown in FIG. 3 (where: a long axis X are laid off the values of frequency logarithm in cycles per second, and along axis Y—the noise level in decibels; the entire scale is 25 db), has been recorded in a sound-proof room using a suitable sound measuring apparatus.

As seen from the spectrogram, the maximum noise level is in the frequency band below 150 c.p.s.

On other frequencies the peaks are quite insignificant.

What we claim is:

1. A low-noise drive mechanism for a motion picture camera having a mirror reflex shutter disposed below the optical axis of the camera with the axis of said shutter disposed at an angle to said optical axis, said mechanism comprising a drive motor, a main drive shaft coupled to said motor, said drive shaft being disposed at an angle to said optical axis, a gear transmission connecting said drive shaft and said shutter, and other gear transmissions connecting said drive shaft and claw and film sprocket, the angular disposition of said drive shaft being such that gear diameters in said transmission are reduced to a minimum thereby resulting in minimum noise output and with peak noise level confined to the low frequency spectrum.

2. A low-noise drive mechanism for a motion picture camera as defined in claim 1 and including an independent cassette take-up drive.

References Cited by the Examiner
UNITED STATES PATENTS

| | | | |
|---|---|---|---|
| 1,144,673 | 6/1915 | Wheeler. | |
| 1,218,342 | 3/1917 | Vinik | 352—206 |
| 2,498,188 | 2/1950 | Vinten | 352—206 |
| 2,551,085 | 5/1951 | Bach | 352—166 |
| 2,771,814 | 11/1956 | Isom | 352—174 |

NORTON ANSHER, *Primary Examiner.*

WILLIAM MISIEK, *Examiner.*